United States Patent
Bryant et al.

(10) Patent No.: US 6,180,989 B1
(45) Date of Patent: Jan. 30, 2001

(54) SELECTIVELY DOPED ELECTROSTATIC DISCHARGE LAYER FOR AN INTEGRATED CIRCUIT SENSOR

(75) Inventors: Frank R. Bryant, Denton; Danielle A. Thomas, Dallas, both of TX (US)

(73) Assignee: STMicroelectronics, Inc., Carrollton, TX (US)

(*) Notice: Under 35 U.S.C. 154(b), the term of this patent shall be extended for 0 days.

(21) Appl. No.: 09/144,182

(22) Filed: Aug. 31, 1998

Related U.S. Application Data

(63) Continuation-in-part of application No. 09/024,094, filed on Feb. 17, 1998, now Pat. No. 6,091,082.

(51) Int. Cl.[7] ................................................. H01L 29/82
(52) U.S. Cl. .......................... 257/414; 257/415; 257/417; 257/418; 257/532; 257/534; 257/655; 257/657; 438/48
(58) Field of Search ................................ 257/414, 655, 257/657, 532, 534, 415, 417, 418; 438/48

(56) References Cited

U.S. PATENT DOCUMENTS

| | | |
|---|---|---|
| 3,493,855 | 2/1970 | Norwich ................................. 324/61 |
| 3,641,431 | 2/1972 | Pigage et al. ...................... 324/61 R |
| 3,781,855 * | 12/1973 | Killen ............................ 340/146.3 E |
| 3,873,927 | 3/1975 | Overall ..................................... 328/4 |
| 3,967,310 | 6/1976 | Horiuchi et al. ....................... 357/54 |
| 4,016,490 | 4/1977 | Weckenmann et al. ........... 324/61 R |
| 4,096,758 | 6/1978 | Moore ................................... 73/718 |
| 4,161,743 | 7/1979 | Yonezawa et al. ..................... 357/54 |
| 4,183,060 | 1/1980 | Barnette et al. ...................... 358/128 |
| 4,394,773 * | 7/1983 | Ruell ....................................... 382/4 |

(List continued on next page.)

FOREIGN PATENT DOCUMENTS

| | | |
|---|---|---|
| 0 226 082 A1 | 6/1987 | (EP) . |
| 0 397 244 A2 | 11/1990 | (EP) . |
| 0 397 244 A3 | 11/1990 | (EP) . |
| 0 397 244 B1 | 11/1990 | (EP) . |
| 0 454 883 B1 | 11/1991 | (EP) . |

(List continued on next page.)

OTHER PUBLICATIONS

Wolffenbuttel et al., "Integrated Tactile Imager With An Intrinsic Contour Detection Option," *Sensors and Actuators*, 16:141–153, 1989.

Sarma et al., "Capacitance–Type Blade–Tip Clearance Measurement System Using a Dual Amplifier with Ramp/DC Inputs and Integration," *IEEE Transactions on Instrumentation and Measurement* 41(5):674–678, Oct. 1992.

Young et al., "Novel Fingerprint Scanning Arrays Using Polysilicon TFT's on Glass and Polymer Substrates," *IEEE Electron Device Letters*, 8(1):19–20, 1997.

Tartagni et al., "A 390dpi Live Fingerprint Imager Based on Feedback Capacitive Sensing Scheme," IEEE International Solid–State Circuits Conference, Feb. 7, 1997, 5 pp.

*Primary Examiner*—William Mintel
(74) *Attorney, Agent, or Firm*—David V. Carlson; Theodore E. Galanthay; Lisa K. Jorgenson

(57) ABSTRACT

A structure and method for creating an integrated circuit passivation structure comprising, a circuit, a dielectric, and metal plates over which an insulating layer is disposed that electrically isolates the circuit, and a discharge layer that is deposited to form the passivation structure that protects the circuit from electrostatic discharges caused by, e.g., a finger, is disclosed. The discharge layer additionally contains dopants selectively deposited to increase electrostatic discharge carrying capacity while maintaining overall sensing resolution.

16 Claims, 5 Drawing Sheets

U.S. PATENT DOCUMENTS

| | | |
|---|---|---|
| 4,428,670 | 1/1984 | Ruell et al. ............... 356/71 |
| 4,429,413 | 1/1984 | Edwards ..................... 382/4 |
| 4,513,298 | 4/1985 | Scheu ..................... 346/140 R |
| 4,571,543 | 2/1986 | Raymond et al. .............. 324/425 |
| 4,577,345 | 3/1986 | Abramov ..................... 382/4 |
| 4,626,774 | 12/1986 | Regtien ..................... 324/61 R |
| 4,656,871 | 4/1987 | Czarnocki ..................... 73/724 |
| 4,763,063 | 8/1988 | Shkedi ..................... 324/60 CD |
| 4,814,691 | 3/1989 | Garbini et al. ............... 324/61 R |
| 4,935,207 | 6/1990 | Stanbro et al. ............... 422/68.1 |
| 4,958,129 | 9/1990 | Poduje et al. ............... 324/661 |
| 5,028,876 | 7/1991 | Cadwell ..................... 324/678 |
| 5,325,442 | 6/1994 | Knapp ..................... 382/4 |
| 5,373,181 * | 12/1994 | Scheiter et al. ............... 257/415 |
| 5,430,381 | 7/1995 | Dower ..................... 324/452 |
| 5,530,581 | 6/1996 | Cogan ..................... 359/265 |
| 5,659,626 | 8/1997 | Ort et al. ............... 382/125 |
| 5,778,089 | 7/1998 | Borza ..................... 382/124 |
| 5,828,773 | 10/1998 | Setlak et al. ............... 382/126 |
| 5,852,670 | 12/1998 | Setlak et al. ............... 382/126 |
| 5,862,248 | 1/1999 | Salatino et al. ............... 382/124 |
| 5,869,791 | 2/1999 | Young ..................... 178/20.01 |
| 5,903,225 * | 5/1999 | Schmitt et al. ............... 340/825.31 |
| 5,920,640 | 7/1999 | Salatino et al. ............... 382/124 |

FOREIGN PATENT DOCUMENTS

| | | |
|---|---|---|
| 0 455 070 B1 | 11/1991 | (EP) . |
| 0 710 593 A1 | 5/1996 | (EP) . |
| 0 779 497 A2 | 6/1997 | (EP) . |
| 0 779 497 A3 | 6/1997 | (EP) . |
| 0 786 745 A2 | 7/1997 | (EP) . |
| 0 786 745 A3 | 7/1997 | (EP) . |
| 0 790 479 A1 | 8/1997 | (EP) . |
| 0 791 899 A2 | 8/1997 | (EP) . |
| 0 791 899 A3 | 8/1997 | (EP) . |
| 2279756A | 1/1995 | (GB) . |
| 2279757A | 1/1995 | (GB) . |
| 2312514A | 10/1997 | (GB) . |
| WO 97/40744 | 11/1997 | (WO) . |
| WO 98/49691 | 11/1998 | (WO) . |
| WO 99/28701 | 6/1999 | (WO) . |

* cited by examiner

SELECTIVELY DOPED ELECTROSTATIC DISCHARGE LAYER FOR AN INTEGRATED CIRCUIT SENSOR

This application is a continuation-in-part of application Ser. No. 09/024,094, filed Feb. 17, 1998, now U.S. Pat. No. 6,091,082.

TECHNICAL FIELD OF THE INVENTION

The present invention relates in general to the field of detection, and more particularly to a structure and method for protecting integrated circuit sensors from the environment of intended use.

BACKGROUND OF THE INVENTION

Without limiting the scope of the invention, its background is described in connection with the protection of integrated circuit fingerprint sensors from the environment during regular use, as an example.

Heretofore, in this field, the detection of fingerprint patterns has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technology that acquires a fingerprint image. In those systems generally, the mechanical and optical sensors obtained a fingerprint image using a scanner or a camera, processed the acquired information into an analog or digital signal that could be analyzed, and provided an output based on the acquired signal. Unfortunately, the lighting and contrast conditions available at the time the image was acquired affected the analysis and consequently the output from the sensor.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. A sensing member contains a multitude of capacitors that sense the patterns of the fingerprint when the finger is pressed against the sensing surface. The information obtained is transformed into an electric signal. The capacitors are insulated from the environment of use by a flexible membrane that conforms itself to the contour of the fingerprint. Unfortunately, the repeated cycles of flexing and compressing the flexible membrane can lead to device failure and the need to replace the membrane.

U.S. Pat. No. 4,353,056 issued to Ruell, et al., discloses a fingerprint sensor that provides an electric output signal in response to the topographic relief of the fingerprint. The sensor incorporates a contact body that is formed at least in part by a light transparent elastic material. The elastic contact material can be attached to a flat sensor plate that has a light receiving surface. The sensor also incorporates a light source and a photodetector to measure the valleys and ridges of the fingerprint. The elastic nature of the contact body of the above described sensor causes cycles of compression and flexing that lead to the deterioration of the contact point between the sensor and the finger.

It has been found, however, that the present methods and structures for protecting fingerprint sensors from the environment of intended use fails to address the distinct environmental exposures to which the sensors are exposed. For example, under ideal conditions the user would gently place the finger on the plate without an excess of pressure or shock. Unfortunately, it is the case that the sensor surface will be exposed to a wide variety of pressures, and that objects other than fingers might come in contact with the sensor surface.

Another problem with current sensors is the need to protect the sensor from electrostatic discharges, e.g., static electricity, caused by the user and the sensor being at different voltage potentials. Users can be exposed to environmental conditions that cause great variances in their electric potential when compared to surrounding objects. Such a difference can be caused by users shuffling their feet across a carpet. When the user approaches the sensor having a great voltage disparity, a sudden electric discharge may cause operational failure of the sensor, both temporary and permanent. Although the current flowing from the discharge may be small, damage to the sensor or the data flowing from the sensor can still occur. While damage to the data or the sensor should be avoided, the sensitivity of the sensor should be maintained at close to optimal levels.

Yet another significant problem of current structures for the protection of fingerprint sensors is contamination from substances, such as oils and proteins that are found on the surface of fingers. To remove these contaminants, it is often necessary to use organic or inorganic solvents or detergents to clean the sensor surface.

Another area of concern is hygiene. Fingers, as well as the environment, tend to contain a number of microbes that need to be removed from the sensor along with finger contaminants. To remove these microbes and reduce the chance of passing a contagion between users, antibacterial, antifungal and decontaminating agents are used to clean the sensors. These decontaminating agents often include harsh abrasives, enzymes, organic or inorganic solvents, or detergents. Furthermore, the sensors are often exposed to oxidating environments, UV rays, and the like during normal use.

What is needed is a structure and method to protect fingerprint sensors from electrostatic discharges, while at the same time maintaining the sensors ability to withstand mechanical stress. The structure should permit continued functioning of the sensor during normal use, and be able to withstand, among other things, the extreme conditions of humidity, electricity, heat, light, etc., to which the sensor may be exposed. The sensor structure should also be resistant to chemical detergents and solvents, but be compatible with the underlying components of the sensor.

SUMMARY OF THE INVENTION

In one embodiment, the invention is directed to an integrated circuit sensor comprising an integrated circuit containing areas of sensing circuitry over which an insulating layer is disposed. The insulating layer helps to electrically isolate the sensing circuitry from subsequent layers and the environment. Next, a discharge layer is formed that is electrically or semi-electrically conductive. The discharge layer dissipates electrical discharges that may be caused when a user touches the sensor. The discharge layer is doped with a dopant in areas disposed over the sensing circuitry and may or may not be doped in other areas. A mechanical protection layer may also be disposed over the discharge layer to provide hermetic and mechanical protection for the underlying circuit. The discharge layer may comprise a silicon-based layer that is partially doped over the entire sensor to increase conductivity. Additionally, the discharge layer may be more heavily doped in areas away from sensing areas. The additional doped areas are coupled to a chip ground that may be coupled to a system ground. In one embodiment the discharge layer is an $SiC_x$ layer, where x is less than 1.

The sensitivity of an integrated circuit sensor can be degraded by adding a highly conductive layer, such as a metal layer. Likewise, it is herein recognized that the discharge layer or sensor surface should be resistant to mechanical stress caused by environmental conditions and use, e.g., scratches. Therefore, the discharge layer is electrically isolated from the functional components of the sensor, for example, capacitors, by including an insulating layer. In one embodiment, the sensor is protected from electrostatic discharges by a passivation that can integrally contain one or more semi-electrically conductive layers, with at least one layer being a discharge layer. Preferably, the discharge layer is an $SiC_x$ layer, where x is varied to maximize hardness and optimize conductivity. In another preferred embodiment the discharge layer is a silicon-based layer that is doped to optimally carry electrical discharges, while at the same time maintaining sensor device sensitivity. The discharge layer can be uniformly doped with a charge-carrying dopant to increase its ability to keep an electric discharge away from the sensor circuitry. Alternatively, the discharge layer may have non-uniform doping where more dopant is included in the discharge layer above areas that do not cover sensing circuitry. In this way, the discharge layer can protect the sensing circuitry from a higher level of electrostatic discharge than an undoped or uniformly doped discharge layer, while maintaining the resolution of the sensor circuitry. The mechanical protection layer and the discharge layer should be compatible and, in one embodiment, can be concurrently formed on the insulating layer. Concurrent deposition of the mechanical protection layer and the discharge layer can be accomplished by, for example, beginning the deposition with SiC and thereafter decreasing the amount of carbon to make a $SiC_x$ layer, where x is less than 1.

In another embodiment, the insulating layer of the integrated circuit passivation can be a silicon oxide layer. Alternatively, the first insulating layer can be silicon nitride. The integrated circuit passivation may further comprise a second insulating layer disposed between the first insulating layer and the mechanical protection layer. The second insulating layer can be silicon oxide or silicon nitride. In yet another embodiment the insulating layer is silicon oxide, and the second insulating layer is silicon nitride, with the discharge layer whose hardness is greater than that of silicon nitride being partially conductive. A mechanical protection layer can also be disposed above or below the discharge layer.

Yet another embodiment of the present invention is a method of fabricating a fingerprint sensor passivation comprising the steps of, obtaining an integrated circuit having areas of sensing circuitry separated by offset areas, depositing a first insulating layer on the integrated circuit and depositing over the first insulating layer a discharge layer that is semi-electrically conductive. The method may further comprising the step of depositing a second insulating layer between the first insulating layer and the discharge layer, and may also include depositing a mechanical protection layer on or below the discharge layer. The mechanical protection layer and the discharge layer should be compatible and, in one embodiment, can be concurrently formed on the insulating layer. Concurrent deposition of the mechanical protection layer and the discharge layer may be accomplished by, for example, beginning the deposition with SiC and thereafter decreasing the amount of carbon to make a $SiC_x$ layer, where x is less than 1. The discharge layer can have dopant implanted in areas above the offset areas. Additionally, dopant can be implanted in the entire discharge layer.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not limit the scope of the invention.

Figure 1:
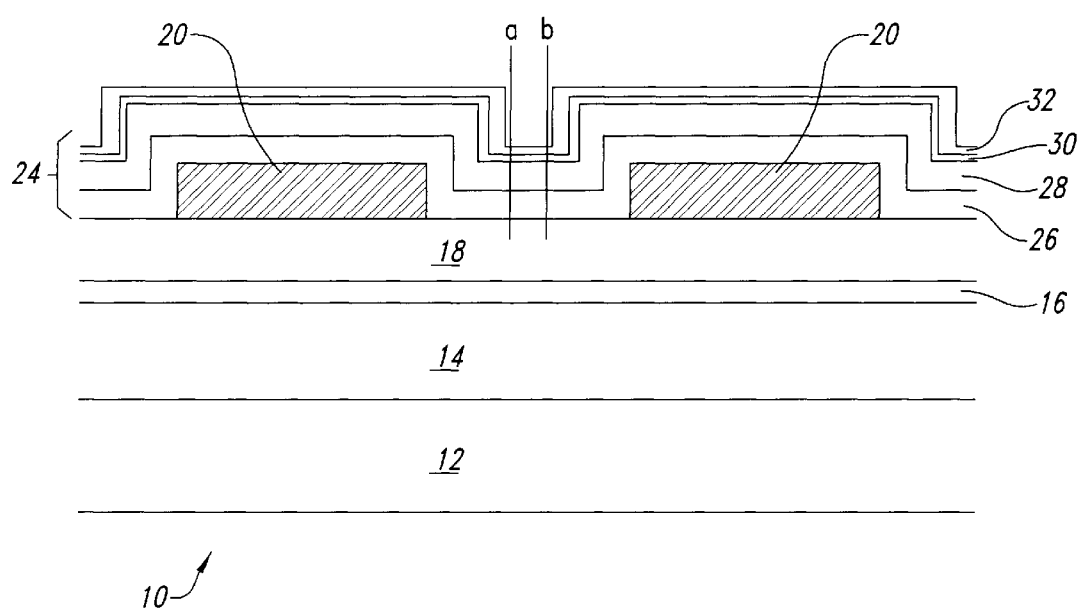
FIG. 1 is an illustrative cross-sectional view of an integrated circuit fingerprint sensor.

The general features of a fingerprint sensor are shown in FIG. 1. A sensor 10, such as a capacitively coupled fingerprint sensor, is formed on a silicon substrate 14 which may be placed on a backside support plastic laminate 12. The substrate 14 can have either a P-type or a N-type conductivity. The substrate 14 may be made of silicon, gallium arsenide, silicon on insulator (SOI) structures, epitaxial formations, germanium, germanium silicon, polysilicon, amorphous silicon, or like substrate materials. Furthermore, the substrate 14 may be made either semi-conductive or conductive. In one embodiment, the substrate 14 is made of single crystal silicon, and is lightly doped with boron, phosphorous or arsenic atoms.

A circuit 16 is formed over the substrate 14 and controls the reporting functions of the silicon sensor 10. A dielectric 18 is disposed on the circuit 16 and prevents conductivity between the circuit 16 and the metal plates 20, which are disposed on the dielectric 18. The sensor 10 circuitry generally includes the metal plates 20 and the circuit 16. Multiple circuits 16 and sets of metal plates 20 are disposed over an entire chip each including components as described herein. The plates 20 are grouped to form multiple sensor units over the area of the sensor 10. In one embodiment, the fingerprint sensor 10 has two metal plates 20, which are placed next to the cell area and are separated from an applied finger (not shown) by a passivation structure 24. The surface of the finger placed above the passivation structure 24 and between the metal plates 20 acts as a third plate opposed to the two metal plates. This structure realizes a two-series connected capacitor circuit. The metal plates 20 can be separately connected to the input and output of a high-gain inverter (not shown). By sensing a change in capacitance in many small sensors located over an entire chip, a pattern corresponding to the ridges and valleys of a fingerprint can be sensed and stored in a suitable storage circuit.

Using the above described capacitance-coupled sensor, resolutions of 390 dots per inch (dpi) can be achieved. With improvements in image processing algorithms, sensors having a resolution of 750 dpi or more can be expected. For use in sensing fingerprint valleys and ridges, an array of cells is used to sample the fingerprint pattern. The chip may also contain conventional timing and voltage controls and references.

Figure 2:
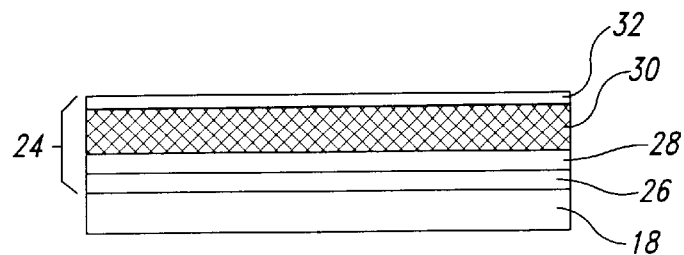
FIG. 2 is an enlarged cross-sectional view of one embodiment of a structure for use with a fingerprint sensor between the lines a–b of FIG. 1.

The structure of the passivation structure 24 for use with the present invention, in one embodiment, is described in conjunction with FIG. 2 (generally a section of the passivation structure 24 taken between lines "a" and "b" of FIG. 1 and not showing the sensor 10 below the circuit 16). FIG. 2 shows a cross-sectional view of the passivation structure 24 and its component layers over the dielectric 18. In one embodiment, the insulating layer 26 is deposited using plasma enhanced chemical vapor deposition (PECVD) and electrically isolates the above layers from the dielectric 18. The insulating layer 26 may be a dielectric layer such as a deposited silicon oxide or a glass. The glass can be doped with, e.g., phosphate, boron, or both. The thickness of the insulating layer 26 can be varied by, for example, changing the bias voltage on the silicon wafer during deposition. Disposed over the insulating layer 26 is a silicon nitride layer 28, which can also be formed by PECVD. A mechanical protection layer 30 is formed over the silicon nitride layer 28, and can be deposited by PECVD. The mechanical protection layer 30 can be, e.g., silicon carbide.

Finally, a discharge layer 32 is shown disposed over the mechanical protection layer 30. The discharge layer 32 can have a chemical composition of $SiC_x$, where the stoichiometric ratio of silicon to carbon can be varied to maximize the hardness of the discharge layer 32, while at the same time providing optional resistivity to maintain the functionality of the sensor 10. The semi-electrical conductivity of the discharge layer 32, however, must also be sufficient to transfer electrostatic discharges created at the surface of the passivation structure 24 to electronic components of the sensor that dissipate the discharge (not depicted). Charge dissipation circuits are well known to those of skill in the art.

The discharge layer 32 can also provide durability to the silicon sensor, and more particularly, the passivation structure 24. The thickness and composition of the discharge layer 32 can be varied to minimize the effect on the sensitivity of the sensor 10 caused by placing the semi-electrically conductive discharge layer 32 between the capacitance source, e.g., a finger, and the sensor 10 circuitry. Although increasing the thickness of the discharge layer 32 improves conductivity of electrostatic discharges for a given configuration and conductivity, it often reduces sensor sensitivity. For any given conductivity and configuration (or shape) of the circuit 16, the thickness of the discharge layer 32 can be varied to optimize discharge capacity and device sensitivity. Likewise, increasing the conductivity of the discharge layer 32 by, e.g., increasing its doping or the ratio of silicon to carbon, would also adversely affect sensitivity while at the same time increase the electrostatic discharge capabilities of the layer.

In one embodiment, the thickness of the discharge layer 32 is about 300 angstroms. The thickness of the discharge layer 32 can be increased or decreased depending on, e.g., the ratio of silicon to carbon, doping, shape and size of the sensor passivation structure 24, and the like, wherein minimizing the amount of carbon increases the conductivity of the discharge layer 32. By using PECVD and silicon-based layers, the adhesion between the layers is not a factor that may detrimentally affect device performance.

The discharge layer 32 also has the advantage that it can be deposited using the same equipment that is presently used to create a passivation structure 24 for use with, e.g., a fingerprint sensor. By using the current PECVD equipment the entire passivation structure 24 can be deposited at lower temperatures (300 degrees Celsius or less). Improved deposition can be performed by depositing the layers on a heated pedestal. Also, the discharge layer 32 is not necessarily a component of the sensor electronics, and can serve as a barrier layer.

Another advantage of using a $SiC_x$ composition as the discharge layer 32 is that it does not generally diffuse into adjacent layers, and even if it did it would not affect device performance. In one embodiment, the discharge layer 32 is $SiC_x$, where x is less than 1. When used in conjunction with a silicon nitride layer 28, the combined layers can serve as oxygen, mobile ion and moisture barriers, thereby protecting the underlying electronics. By having a higher carbon stoichiometry, the discharge layer 32 can also aid in improving the scratch resistance of the passivation structure 24 due to its coefficient of hardness.

Figure 3:
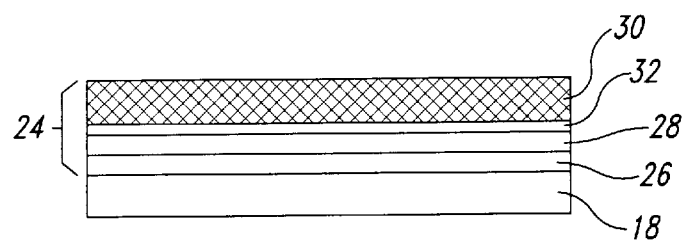
FIG. 3 is an enlarged cross-sectional view of another embodiment of a structure for use with a fingerprint sensor between the lines a–b of FIG. 1.

Another embodiment is described in conjunction with FIG. 3. Like FIG. 2, in FIG. 3 show a partial cross-sectional view of the passivation structure 24 over the circuit 16. The insulating layer 26 is deposited over the dielectric 18 using, for example, PECVD. Disposed directly over the insulating layer 26 is a nitride layer 28 that is covered by the discharge layer 32. Over the discharge layer 32 is the mechanical protection layer 30. The configuration for the passivation structure 24 depicted in FIG. 3 is expected to provide better scratch resistance than the passivation structure 24 depicted in FIG. 2. However, it may provide less protection from an electrostatic discharge event than in the embodiment of the passivation structure 24 that has the discharge layer 32 over the mechanical protection layer 30.

Figure 4:
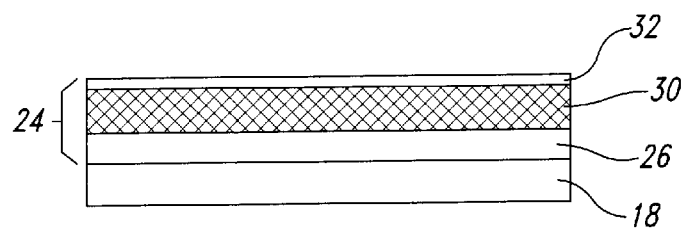
FIG. 4 is an enlarged cross-sectional view of another embodiment of a structure for use with a fingerprint sensor between the lines a–b of FIG. 1.

An alternative embodiment of the invention is shown in FIG. 4 in which the passivation structure 24 comprises an insulating layer 26 disposed over the dielectric 18. Directly on the insulating layer 26 is deposited the mechanical protection layer 30. Over the mechanical protection layer 30 is the discharge layer 32. This passivation structure 24 provides the necessary insulation and strength for protecting the circuit 16 and reduces the number of steps required to form the passivation structure 24. The configuration depicted in FIG. 4, however, may not have the same moisture and oxidation resistance attributes conferred by the nitride layer 28 used in the embodiments described above in conjunction with FIGS. 2–3.

Figure 5:
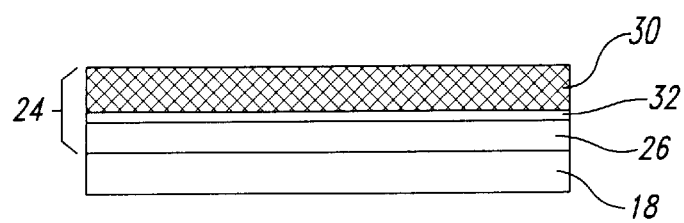
FIG. 5 is an enlarged cross-sectional view of yet another embodiment of a structure for use with a fingerprint sensor between the lines a–b of FIG. 1.

An alternative embodiment of the invention is shown in FIG. 5 in which the passivation structure 24 comprises an insulating layer 26 disposed over the dielectric 18. Directly on the insulating layer 26 is deposited the discharge layer 32 followed by deposition of the mechanical protection layer 30. As with the configuration described in conjunction with FIG. 4, this passivation structure 24 provides the necessary insulation and strength for protecting the circuit 16 and reduces the number of steps required to form the passivation structure 24. However, it may not have the same moisture and oxidation resistance attributes conferred by the nitride layer 28 used in the embodiments described above in conjunction with FIGS. 2–3.

When viewed together, FIGS. 4 and 5 show the extremes of a spectrum for the discharge layer 32. The mechanical protection layer 30 and the discharge layer 32 can actually be one and the same. However, the stoichiometry of silicon to carbon can be varied throughout the discharge layer 32 to optimize the discharge capacity of the discharge layer 32, while at the same time maximizing the hardness of the passivation structure 24. For example, the portion of the passivation structure 24 closest to the insulating layer 26 can have a $SiC_x$ stoichiometry closest to 1. As the passivation structure 24 is deposited, the stoichiometry of silicon to carbon can be varied to reduce the amount of carbon in the $SiC_x$ mixture that is deposited to increase the conductivity of the discharge layer 32. The passivation structure 24 may also be doped during, or after, deposition.

Figure 6:
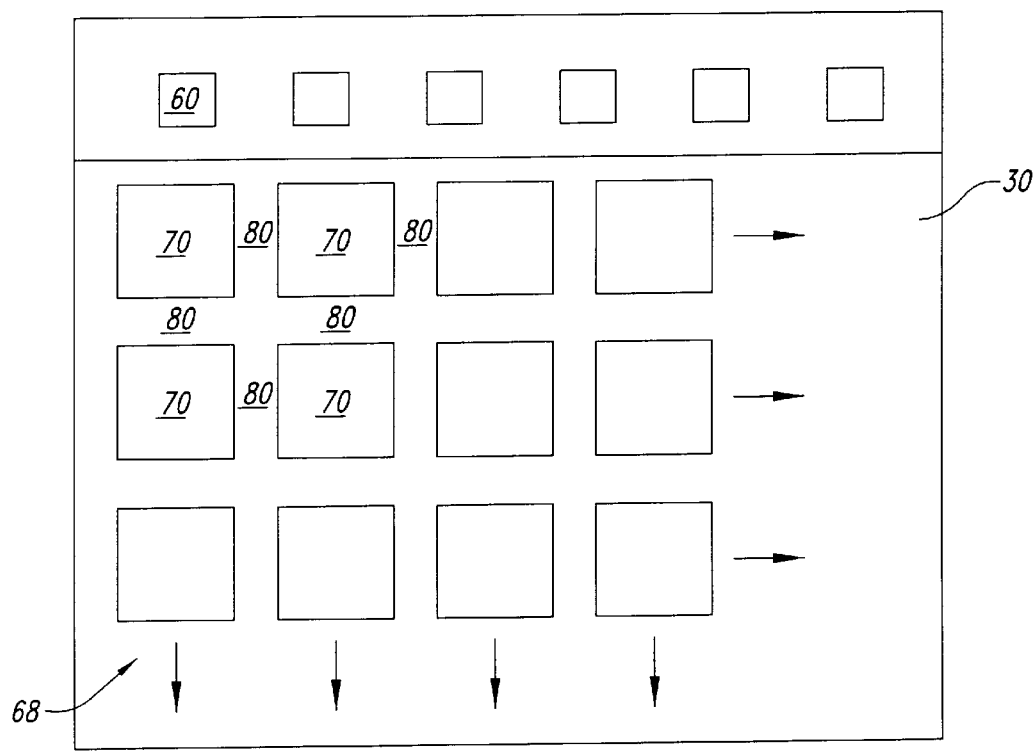
FIG. 6 is a top view of an integrated circuit that includes sensor circuitry.

FIG. 6 shows an embodiment of the present invention that includes the fingerprint sensor 10 of FIG. 1. On an integrated circuit 50, a sensing array 68 made of multiple instances of sensing circuits 70 is disposed. As shown by the arrows, these sensing circuits 70 continue through as much of the length and width of the integrated circuit 50 as necessary to provide the desired size for the array 68. In one embodiment, the array 68 is formed large enough to sense a fingerprint. Offset areas 80 separate the sensing circuits 70 from one another. These offset areas 80 include no sensing circuitry. In one embodiment of the invention, the passivation layer 24 (FIGS. 2–5) covers the entire integrated circuit 50. As described above, the passivation layer 24 includes an electric discharge layer 32 used to carry electrostatic charges away from the sensing circuits 70 to a system ground pad 60. The electrostatic discharge layer 32 is coupled to a system ground pad 60 by conventional means. Also as described above, the discharge layer may be doped with a dopant, such as boron, phosphorous, or arsenic, to increase the amount of charge the discharge layer 32 can carry. As the amount of dopant in the discharge layer 32 increases so does the charge carrying ability of the layer. But as the doping level of the layer 32 increases, the sensing circuits 70 may become less proficient in sensing the change in capacitance between the metal plates 20, and thus cause a decrease in the resolution of the fingerprint sensor 10.

Still referring to FIG. 6, another embodiment of the invention increases the amount of charge that the electrostatic discharge layer can dissipate, while maintaining the resolution of the sensor. In the discharge layer 32, moderate amounts of dopants are implanted into the entire discharge layer 32. This increases the charge carrying capability of the discharge layer 32 as discussed above. A further concentration of dopants are implanted in the discharge layer 32 only above the offset areas 80. This increased concentration of dopant over the offset areas 80 allows the discharge layer 32 to carry more charge than an undoped or a moderately doped discharge layer 32. Additionally, because none of the additional dopant is implanted over the sensing circuit 70, the sensing circuits 70 maintain a fuller range of capacitance sensing ability. Thus, the electrostatic discharge layer 32 that is selectively doped is able to protect the integrated circuit 50 from larger electrostatic discharges than the layer 32 of FIGS. 2–5 without reducing the sensitivity of the fingerprint sensor 10.

Figure 7:
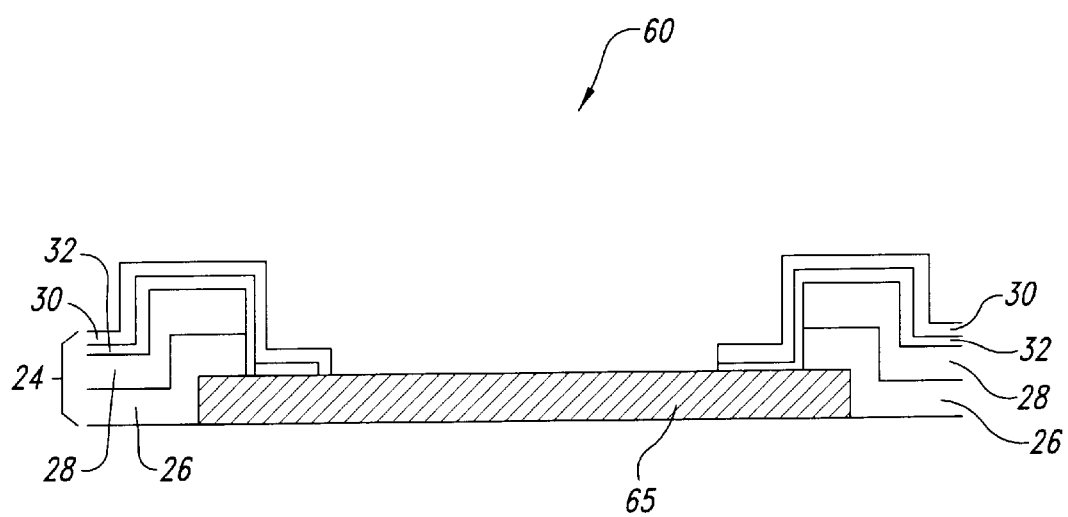
FIG. 7 is a cross-sectional view of a system ground pad according to an embodiment of the invention.

An embodiment of the system ground pad 60 is shown in FIG. 7. A metal bond pad 65 is partially covered by the passivation structure 24, which is configured as shown in FIG. 3. The discharge layer 32 covers the insulating and nitride layers 26, 28, as well as a portion of the bond pad 65. The mechanical protection layer 30 covers the discharge layer 32. The same structure may be repeated on the opposite side of the metal bond pad 65. If an electrostatic discharge occurs in the passivation layer 24, it is carried by the discharge layer 32 to the bond pad 65. This bond pad 65 can be coupled to a system ground through conventional means, such as through a wire bond (not shown). Any electrostatic discharge that would otherwise have been applied to the sensor circuit 70 is instead carried along the electrostatic discharge layer 32 onto the bond pad 65 and through the wire bond (not shown) to the chip ground, which may be coupled to a system ground located off the chip (also not shown).

Figure 8:
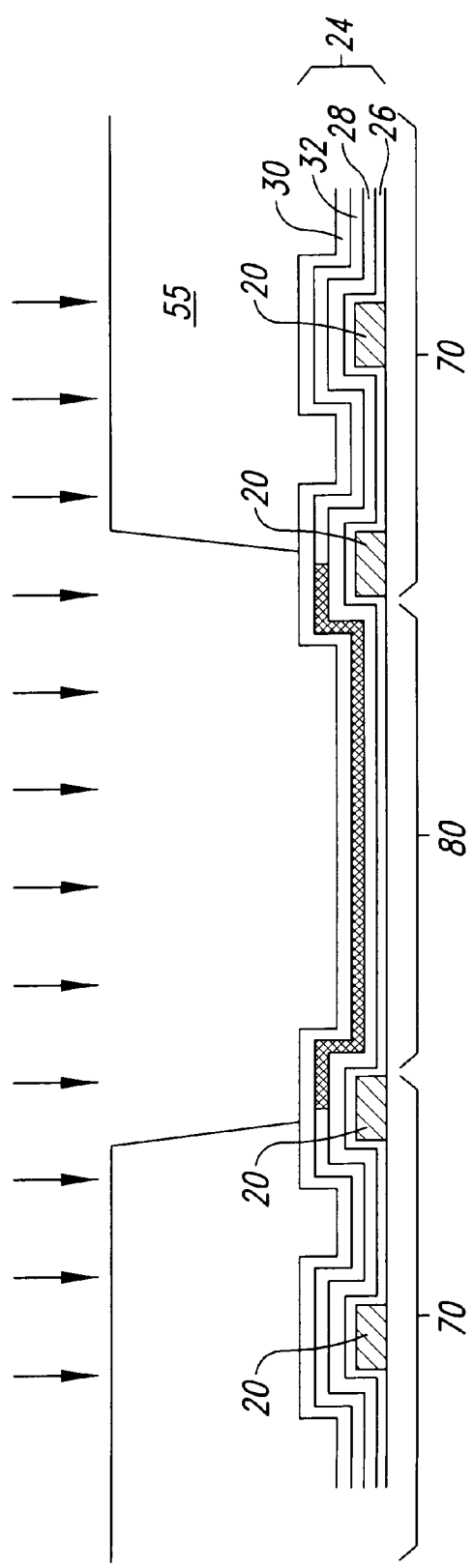
FIG. 8 is a cross-sectional view of a portion of a fingerprint sensor according to an embodiment of the invention.

An embodiment of a method used to implant the dopant into the discharge layer 32 is discussed in conjunction with FIG. 8. As discussed above, each section of the offset area 80 is bordered by two areas of the sensing circuitry 70. The passivation layer 24 is shown in the same configuration as discussed above in conjunction with FIG. 3. A photoresist or some other blocking layer 55 is patterned so that an opening is more or less above the offset area 80. A dopant such as arsenic, phosphorous or boron is implanted at a voltage high enough to drive the dopant through the mechanical protection layer 30 and into the electrostatic discharge layer 32. The patterning of the photoresist layer 55 need not be exactly over the offset area 80.

Because the sensing circuitry 70 measures the capacitance between the metal plates 20, some amount of dopant can be present above the metal plates closest to the offset area 80 without significantly reducing the sensing ability of the adjacent circuits 70. Since the dopant in this area does not affect the ability of the sensing circuitry 70 to sense capacitance changes, the overall resolution of the fingerprint sensor is maintained. Once the dopant is implanted, the photoresist layer 55 is stripped and the selective implanting process is complete. In another embodiment, an overall implant is also performed throughout the discharge layer 32 both above the offset areas 80 and the sensing circuitry 70. This overall dopant implant can occur before or after the selective implant that is only above the offset areas 80. Care must be taken, however, to ensure that the amount of dopant implanted in the electrostatic discharge layer 32 does not overly impede the ability of the sensing circuitry 70 to sense a change in capacitance.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An integrated circuit, comprising:
   a substrate;
   sensor circuits disposed on the substrate;
   isolation regions disposed on the substrate between the sensor circuits;

an insulating layer disposed on the sensor circuits and the isolation regions; and an electric discharge layer disposed on the insulating layer and including, in areas above the sensor circuits, a first concentration of a first dopant, and including in areas above the isolation regions a second concentration of a second dopant, the second concentration greater than the first concentration.

2. The integrated sensor of claim 1 wherein the dopant is selected from the group consisting essentially of phosphorous, boron and arsenic.

3. The integrated sensor of claim 1 wherein the sensor circuits are arranged in a grid pattern.

4. The integrated sensor of claim 1 wherein the sensing circuits comprise both sensing and non-sensing portions and wherein the areas of the electric discharge layer doped with the second dopant cover part of the non-sensing portions of the sensing circuits.

5. The integrated sensor of claim 1 wherein the first dopant is implanted into the electric discharge layer.

6. The integrated sensor of claim 1 wherein the electric discharge layer is defined as comprising:

a silicon carbide layer disposed over the insulating layer;

a discharge layer, wherein the discharge layer is $SiC_x$ and wherein x is less than 1.

7. The integrated sensor of claim 1 wherein the first concentration of the first dopant is zero.

8. The integrated sensor of claim 1 wherein the first dopant and the second dopant comprise the same dopant.

9. A fingerprint sensor on an integrated circuit comprising:

a substrate;

a plurality of sensor circuits disposed on the substrate and each separated from one another by offset areas;

an insulating layer disposed over the sensor circuitry and the offset areas; and an electric discharge layer disposed over the insulating area, the electric discharge layer containing a higher concentration of charge-carrying dopants in areas above the offset areas than in other areas of the electric discharge layer.

10. The fingerprint sensor of claim 9 wherein the other areas of the electric discharge layer contain no dopants.

11. The integrated sensor of claim 9 wherein the charge-carrying dopants comprise one or more of boron, phosphorous, and arsenic.

12. The integrated sensor of claim 9 wherein the sensor circuits are arranged in a grid pattern and the offset areas surround each sensor circuit.

13. The integrated sensor of claim 9 wherein the sensing circuits comprise both sensing and non-sensing portions and wherein the areas of the electric discharge layer having a higher concentration of charge-carrying dopants cover the non-sensing portions of the sensing circuitry.

14. The integrated sensor of claim 9 wherein the dopants are implanted into the electric discharge layer.

15. The integrated sensor of claim 9 wherein the electric discharge layer is defined as comprising:

a silicon carbide layer covering the insulating layer; and a discharge layer adjacent to the silicon carbide layer, wherein the discharge layer is $SiC_x$ and wherein x is less than 1.

16. The integrated sensor of claim 9 wherein the higher concentration areas are doped with the same type of dopant as the other areas of the electric discharge layer.

* * * * *